United States Patent
Fontana et al.

(10) Patent No.: US 9,701,209 B2
(45) Date of Patent: Jul. 11, 2017

(54) CHARGING DEVICE AND METHOD OF DELIVERING CURRENT TO A POWER STORAGE DEVICE

(75) Inventors: Edward Clark Fontana, Rockwall, TX (US); Robert John Minor, Dallas, TX (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 13/544,393

(22) Filed: Jul. 9, 2012

(65) Prior Publication Data

US 2014/0009112 A1  Jan. 9, 2014

(51) Int. Cl.
*H02J 7/00* (2006.01)
*B60L 11/18* (2006.01)

(52) U.S. Cl.
CPC ....... *B60L 11/1816* (2013.01); *B60L 11/1825* (2013.01); *B60L 11/1827* (2013.01); *B60L 11/1833* (2013.01); *B60L 11/1846* (2013.01); *B60L 11/1848* (2013.01); *B60L 2230/16* (2013.01); *B60L 2270/32* (2013.01); *B60L 2270/34* (2013.01); *H02J 7/0029* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .... H02J 7/00; H04N 7/18; G06K 5/00; G06F 1/26; H01R 13/46
USPC ........................................................ 320/109
See application file for complete search history.

(56) References Cited

U.S. PATENT DOCUMENTS

| | | | |
|---|---|---|---|
| 3,794,956 A * | 2/1974 | Dubreuil ....................... | 439/131 |
| 5,575,668 A * | 11/1996 | Timmerman ................. | 439/131 |
| 7,605,330 B1 * | 10/2009 | Black et al. .................... | 174/54 |
| 8,025,526 B1 | 9/2011 | Tormey et al. | |
| 8,075,329 B1 | 12/2011 | Janarthanam et al. | |
| 2009/0082916 A1 | 3/2009 | Tanaka | |
| 2010/0207588 A1 | 8/2010 | Lowenthal et al. | |
| 2011/0140656 A1 | 6/2011 | Starr et al. | |
| 2011/0145141 A1 * | 6/2011 | Blain .............................. | 705/39 |
| 2011/0181240 A1 | 7/2011 | Baarman et al. | |
| 2012/0007554 A1 * | 1/2012 | Kanamori ........... | B60L 11/1824 320/109 |
| 2012/0059533 A1 * | 3/2012 | Oh ........................ | H04L 67/125 701/2 |
| 2012/0071017 A1 | 3/2012 | Gaul et al. | |
| 2012/0088382 A1 | 4/2012 | Konchan | |
| 2013/0076902 A1 * | 3/2013 | Gao et al. ..................... | 348/148 |

FOREIGN PATENT DOCUMENTS

WO    2012159950 A1    11/2012

OTHER PUBLICATIONS

ChargePoint Networked Charging Stations, Copyright 2010, Coulomb Technologies, Inc., pp. 1-4, Campbell, CA, USA; available at http://www.coulombtech.com/files/CT2100-Data-Sheet.pdf, last visited Jul. 9, 2012.
Electric Vehicle Charging Solutions, GE Energy Industrial Solutions, pp. 1-8, Ref. E/5379/E/Ex. 5.0 Ed., Feb. 2011.
Siemens Community Multi-Level Electric Vehicle Charging Solutions, pp. 1-2, Published by and Copyright 2010, Siemens AG, Siemens Energy, Inc. Wendell, North Carolina, USA.
Chinese-language Office Action, dated Mar. 2, 2017, for CN patent application No. 201410057729.2 (8 pgs).

* cited by examiner

*Primary Examiner* — Arun Williams
(74) *Attorney, Agent, or Firm* — General Electric Company (57) ABSTRACT

A charging device for a power storage device includes a current control device configured to selectively enable and disable current from being delivered to the power storage device. The charging device also includes an actuator that moves at least a first portion of the charging device from a first position to a second position, and a controller coupled to the actuator and the current control device. The controller determines whether a predetermined actuation condition is met, activates the actuator to move the at least a first portion of the charging device to the second position upon the determination that the predetermined actuation condition is met, and controls the current control device to enable current to be delivered when the at least a first portion of the charging device is in the second position.

19 Claims, 4 Drawing Sheets

CHARGING DEVICE AND METHOD OF DELIVERING CURRENT TO A POWER STORAGE DEVICE

BACKGROUND OF THE INVENTION

The present application relates generally to charging devices and, more particularly, to a charging device and a method of delivering current to a power storage device.

As electric vehicles and/or hybrid electric vehicles have gained popularity, an associated need to manage delivery of electrical energy to such vehicles has increased. Moreover, a need to provide safe and efficient charging devices or stations has been created by the increased use of such vehicles.

At least some known electric vehicles include an internal battery that is charged using a charging station. Such charging stations typically include a power cable or another conductor that may be removably coupled to the electric vehicle. The charging stations receive electricity from an electric utility distribution network or another electricity source, and deliver electricity to the electric vehicle battery through the power cable.

Some known charging stations are positioned in public or publicly accessible locations, such as parking garages or parking lots, to provide paid charging services to customers who park electric vehicles within the locations. Due to the publicly accessible nature of the charging station locations, the charging stations positioned therein may be subjected to vandalism, theft, or other damage when the charging stations are not in use.

BRIEF DESCRIPTION OF THE INVENTION

In one embodiment, a charging device for use with a power storage device is provided that includes a current control device configured to selectively enable and disable current from being delivered to the power storage device. The charging device also includes an actuator configured to move at least a first portion of the charging device from a first position to a second position, and a controller coupled to the actuator and to the current control device. The controller is configured to determine whether a predetermined actuation condition is met, activate the actuator to move the at least a first portion of the charging device to the second position upon the determination that the predetermined actuation condition is met, and control the current control device to enable current to be delivered to the power storage device when the at least a first portion of the charging device is in the second position.

In another embodiment, a method of delivering current to a power storage device is provided that includes determining, by a controller, whether a predetermined actuation condition is met, activating an actuator to move at least a first portion of a charging device from a first position to a second position upon the determination that the predetermined actuation condition is met, and controlling a current control device to enable current to be delivered to the power storage device when the at least a first portion of the charging device is in the second position.

DETAILED DESCRIPTION OF THE INVENTION

As described herein, a robust and effective charging device is provided for an electric vehicle. The charging device includes a controller and an actuator controlled by the controller. The charging device is positioned within a first position, such as within a chamber formed in the ground or within an enclosure, when the charging device is not performing a charging operation. If the controller determines that an actuation condition is satisfied, the controller controls the actuator to move the charging device to a second position, such as at least partially above ground or at least partially outside of the enclosure. When the charging device is positioned in the second position, a power conduit of the charging device is enabled to be coupled to the electric vehicle. The controller operates a current control device to enable current to be delivered to the electric vehicle through the power conduit. Accordingly, as described herein, the charging device is protected from vandalism, theft, or other damage when not in use.

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
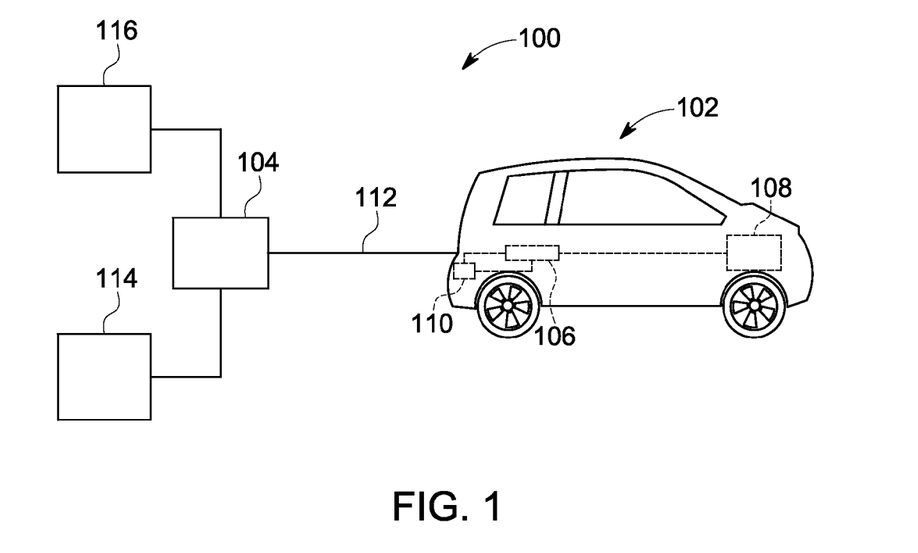
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. Moreover, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. Moreover, in the exemplary embodiment, charging device 104 is coupled to an electric power source 114, such as a power grid of an electric utility company, a generator, a battery, and/or any other device or system that provides electricity to charging device 104.

Charging device 104 is coupled to at least one server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

Server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable storage medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
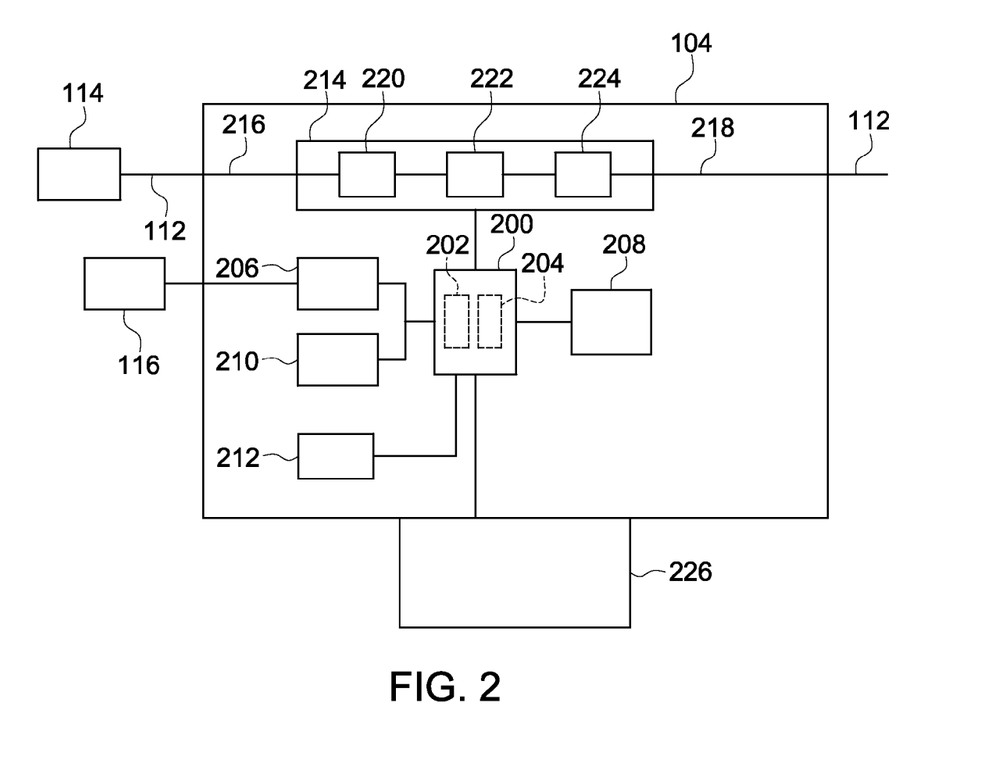
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a communication device 212, and to a current control module 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system, such as server 116 (shown in FIG. 1). Network interface 206 communicates with server 116 and controller 200 using any suitable communication protocol, such as a wired and/or a wireless Ethernet protocol.

Display 208 may include a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, power consumption information of charging device 104 and/or of electric vehicle 102, fault information of charging device 104 and/or of vehicle 102, and/or any other information may be displayed to a user on display 208.

User interface 210 includes, without limitation, a keyboard, a keypad, a touch-sensitive screen, a push button, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may input user authentication information and/or payment information using user interface 210. Moreover, the user may operate user interface 210 to initiate and/or terminate the delivery of power to power storage device 106.

In an exemplary embodiment, communication device 212 enables charging device 104 to detect when electric vehicle 102 is positioned within a predetermined distance from charging device 104. In one embodiment, communication device 212 also enables charging device 104 to receive a signal from a device employed by a user (hereinafter referred to as a "user device"), such as a wireless or remote control key fob, a cellular phone, or a payment card, for example. Communication device 212 includes, without limitation, a wireless receiver or transceiver, an RFID device, a near field communication device, an infrared detector, a metal detector, and/or any other suitable device that enables charging device 104 to detect the presence of electric vehicle 102 and/or to receive a signal from the user device. In one embodiment, communication device 212 is integrated within user interface 210 or network interface 206.

Current control module 214 is coupled to an input end 216 of power conduit 112 and to an output end 218 of power conduit 112. Input end 216 is coupled to a power source, such as electric power source 114 (shown in FIG. 1), and output end 218 is coupled to a load, such as power storage device 106. More specifically, in an exemplary embodiment, input end 216 is coupled to a single phase of a three phase alternating current (AC) power source, such as electric power source 114. Alternatively, input end 216 may be coupled to a direct current (DC) power source or to two or three phases of an AC power source.

Current control module 214 includes at least one current protection device 220, at least one current control device 222, and at least one current sensor 224. In one embodiment, if power conduit 112 includes a plurality of conductors for receiving a plurality of phases of AC power from electric power source 114, each conductor of power conduit 112 may include a separate current protection device 220, current control device 222, and/or current sensor 224.

Current protection device 220, in an exemplary embodiment, is activated to electrically isolate input end 216 from output end 218 if the current flowing through power conduit 112 exceeds a predetermined threshold or current limit. More specifically, current protection device 220 activates, or "trips," when the current flowing through power conduit 112 exceeds a rated current limit of current protection device 220. When current protection device 220 activates or trips, current is prevented from flowing through power conduit 112 (i.e., input end 216 is electrically isolated from output end 218). In an exemplary embodiment, current protection device 220 is a circuit breaker. Alternatively, current protection device 220 may be a fuse, a relay, and/or any other device that enables current protection device 220 to function as described herein.

Current control device 222, in an exemplary embodiment, is a contactor 222 coupled to current protection device 220 by power conduit 112. Moreover, contactor 222 is coupled to, and is controlled by, controller 200. In an exemplary embodiment, controller 200 operates contactor 222 (e.g., opens contactor 222) to interrupt the current flowing through power conduit 112 if a fault is detected and/or if a charging operation is not in progress. As such, by operating or activating contactor 222, controller 200 prevents current from flowing to power storage device 106. In addition, controller 200 operates contactor 222 (e.g., closes contactor 222) to enable current to flow to power storage device 106, for example, if the charging operation is being performed.

At least one current sensor 224 measures and/or detects the current transmitted through power conduit 112 during operation of charging device 104. In an exemplary embodiment, current sensor 224 is a current transformer that measures an amount of current transmitted through power conduit 112. Current sensor 224 transmits one or more signals representative of the measured and/or detected current to controller 200.

Actuator 226 is a device that is coupled to controller 200 to selectively move charging device 104, or at least a portion thereof, from a first position to a second position, as is more fully described herein. In an exemplary embodiment, actuator 226 is a hydraulic lift that is controlled by controller 200 to raise charging device 104 from the first position to the second position and to lower charging device 104 from the second position to the first position. Alternatively, actuator 226 is any other lift or mechanism that enables charging device 104 to be controllably moved between the first position and the second position by controller 200.

Figure 3:
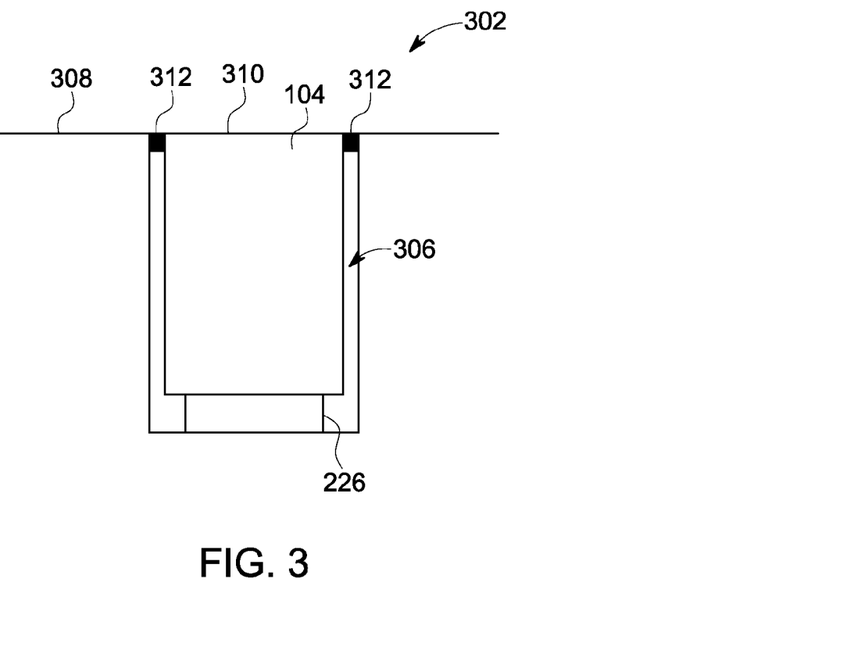
FIG. 3 is a block diagram of the charging device shown in FIG. 1 positioned in a first position within a chamber.
Figure 4:
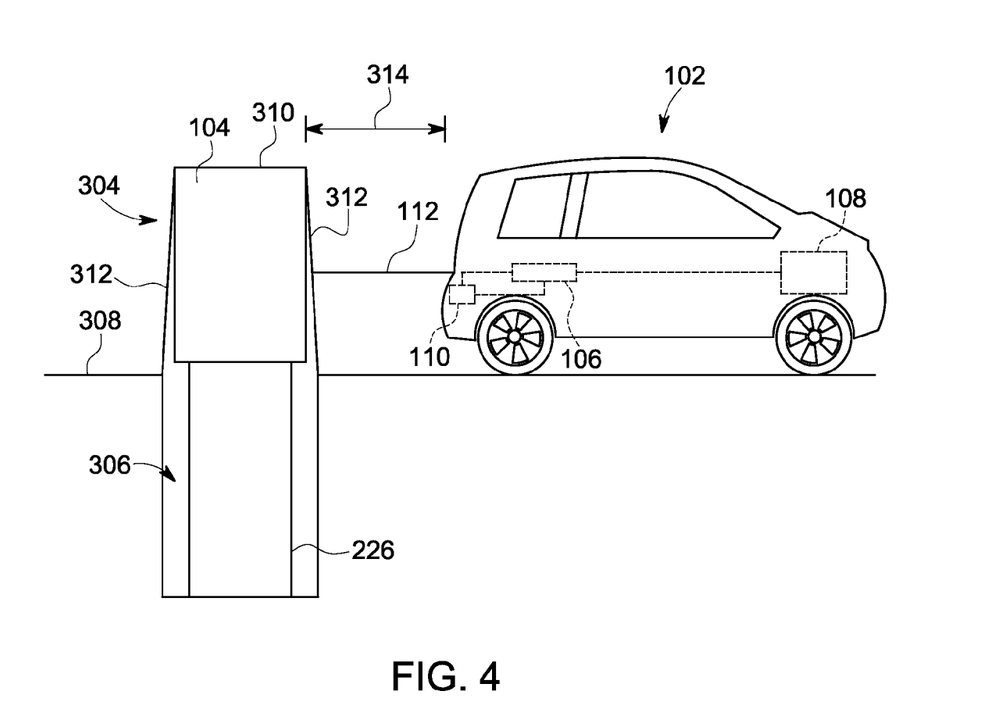
FIG. 4 is a block diagram of the charging device shown in FIG. 1 positioned in a second position with respect to a chamber.

FIG. 3 is a block diagram of an exemplary charging device 104 positioned in a first position 302. FIG. 4 is a block diagram of charging device 104 positioned in a second position 304.

Referring to FIG. 3, a chamber 306 is formed within a surface, such as ground 308, proximate to an electric vehicle parking location, for example. Chamber 306 is sized to receive charging device 104, or one or more portions thereof.

When charging device 104 is positioned in first position 302, actuator 226 is retracted and charging device 104 is positioned within chamber 306 such that a top surface 310 of charging device 104 is flush, or substantially flush, with ground 308. Accordingly, in first position 302, charging device 104 is less likely to be damaged, vandalized, and/or stolen than a charging device that is fixed in a position above ground 308. It should be recognized that, while charging device 104 is described as being positioned in first position 302 and second position 304, one or more portions or components of charging device 104, such as at least a portion of power conduit 112, may be movable between first position 302 and second position 304 while other components of charging device 104 may remain in a fixed position. However, for the sake of clarity, the embodiments are described herein with reference to charging device 104 being movable between first position 302 and second position 304.

In one embodiment, an expandable accordion bladder 312 or another device is positioned around charging device 104, and/or coupled to charging device 104, to prevent water from entering chamber 306 when charging device 104 is in first position 302 and/or second position 304. In an alternative embodiment, at least a portion of charging device 104 extends above ground 308 when charging device 104 is in first position 302.

It should be recognized that, while some components of charging device 104, such as power conduit 112, are inaccessible to a user, one or more other components of charging device 104, such as user interface 210 and/or communication device 212, remain accessible to the user while charging device 104 is in first position 302. Accordingly, the user may access charging device 104 to enter payment and/or initiate the charging operation while charging device 104 is in first position 302.

In an exemplary embodiment, controller 200 (shown in FIG. 2) controls actuator 226 to raise charging device 104, or one or more portions thereof, from first position 302 to second position 304 (shown in FIG. 4) if controller 200 determines that a predetermined actuation condition is met. In an exemplary embodiment, controller 200 determines that the predetermined actuation condition is met when controller 200 determines that an electric vehicle 102 is within a predetermined distance 314 from charging device 104, a payment has been entered into charging device 104 to initiate a charging operation, and/or any other condition is met that enables charging device 104 to function as described herein. In one embodiment, predetermined distance 314 is selected to substantially match an extendable length of power conduit 112. Accordingly, in such an embodiment, the predetermined actuation condition is met when electric vehicle 102 is positioned such that power conduit 112 is able to be plugged into electric vehicle 102. As used herein, the term "raise" refers to moving an object, such as charging device 104, in a substantially vertical or perpendicular direction with respect to ground 308 or another surface on which charging device 104 is positioned while in first position 302.

In one embodiment, controller 200 determines that electric vehicle 102 is within predetermined distance 314 from charging device 104 by reading an identifier, such as a radio frequency identification (RFID) chip or tag coupled to electric vehicle 102. For example, charging device 104 transmits a radio frequency (RF) signal periodically or intermittently using communication device 212 (shown in FIG. 2) and determines that electric vehicle 102 is present if the RFID tag corresponds to an electric vehicle and/or an electric vehicle manufacturer. Alternatively, controller 200 uses communication device 212 to determine that electric vehicle 102 is within predetermined distance 314 from charging device 104 by detecting an interference in a magnetic field generated by charging device 104, by receiving a signal from electric vehicle 102, by receiving a signal from a user device such as a key fob and/or a cellular phone, and/or by any other mechanism that enables charging device 104 to operate as described herein.

During operation, actuator 226 is retracted to maintain charging device 104 in first position 302 when charging device 104 is not in use and/or when charging device 104 is not charging, or providing current to, power storage device 106 of electric vehicle 102. It should be recognized that, in an exemplary embodiment, power conduit 112 is not able to be extended from charging device 104 and/or is retained at least partially within charging device 104 when charging device 104 is in first position 302. When controller 200 determines that the actuation condition is met, controller 200 transmits a signal to actuator 226 to cause actuator 226 to raise charging device 104 from first position 302 to second position 304. For example, when controller 200 detects that electric vehicle 102 is positioned within predetermined distance 314 from charging device 104, controller 200 controls actuator 226 to raise charging device 104 to second position 304. Alternatively, controller 200 controls actuator 226 to raise charging device 104 to second position 304 if a user engages a key fob, a cellular phone, and/or any other device to transmit a signal to controller 200 through communication device 212.

In one embodiment, electric vehicle 102 transmits a signal to charging device 104 to cause controller 200 to raise charging device 104 from first position 302 to second position 304. For example, if electric vehicle 102 detects that the user turns off electric vehicle 102, engages a charging port door release button, locks or unlocks one or more doors of electric vehicle 102, and/or shifts a drive train of electric vehicle to a parked position or another similar position, electric vehicle 102 automatically transmits a predetermined signal to charging device 104 to cause charging device 104 to move to second position 304.

When charging device 104 is positioned in second position 304, power conduit 112 is extendable from charging device 104. Accordingly, the user extends power conduit 112 and couples (or "plugs in") power conduit 112 to a charging port (not shown in FIGS. 3 and 4) of electric vehicle 102. The user enters payment information into charging device 104. Once the payment information has been entered and/or verified, charging device 104 initiates a charging operation to provide current to power storage device 106.

When the charging operation has completed, power conduit 112 is disengaged and the user returns power conduit 112 to charging device 104. Alternatively, the user disengages power conduit 112 from electric vehicle 102 and charging device 104 automatically retracts power conduit 112 into charging device 104. When power conduit 112 has been returned to charging device 104, controller 200 causes actuator 226 to retract charging device 104 into chamber 306, i.e., into first position 302.

More specifically, in one embodiment, controller 200 causes actuator 226 to retract, or move, charging device 104 from second position 304 to first position 302 upon a determination that another, or second, actuation condition is met. The second actuation condition may include, for example, a determination that at least a portion of power conduit 112 (e.g., a charging end of power conduit 112) has been returned to charging device 104 or a determination that power conduit 112 is disconnected from electric vehicle 102. Alternatively, in some embodiments, at least a portion of power conduit 112 may be removable from charging device 104. Accordingly, in such embodiments, the second actuation condition may be met if it is determined, for example, by controller 200, that at least a portion of power conduit 112 is disconnected from charging device 104.

Figure 5:
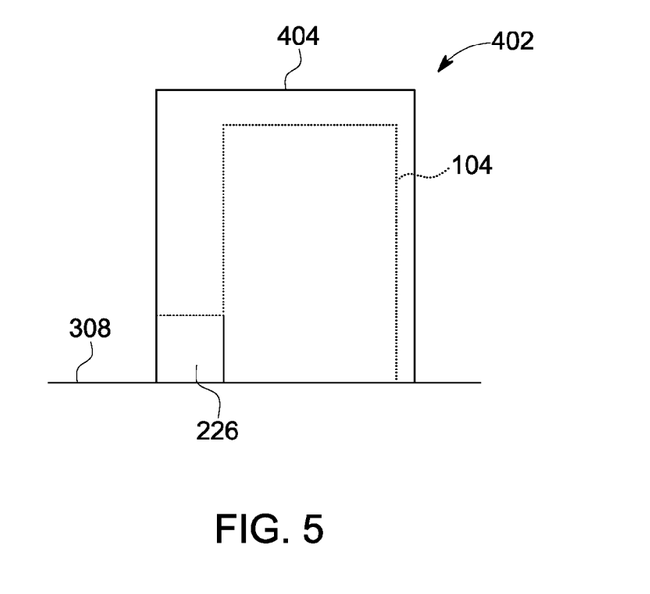
FIG. 5 is a block diagram of the charging device shown in FIG. 1 positioned in a first position within an enclosure.
Figure 6:
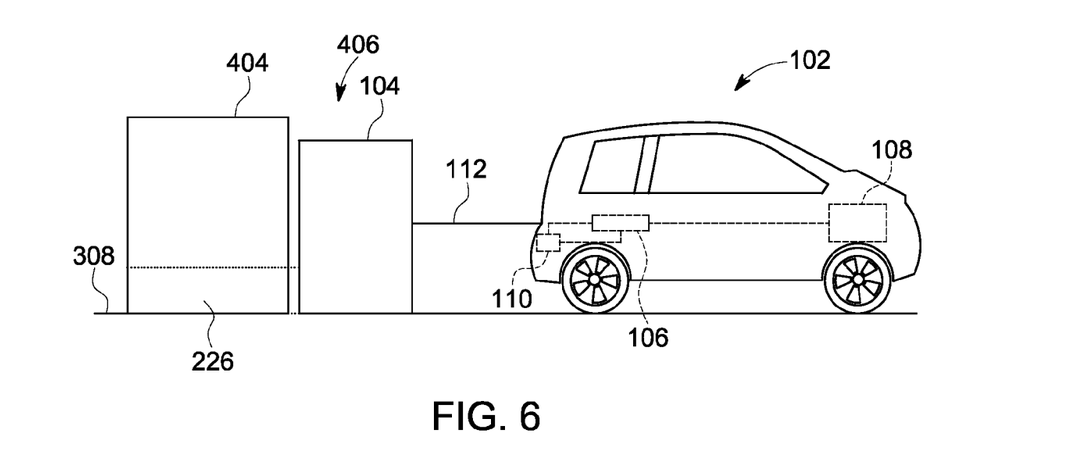
FIG. 6 is a block diagram of the charging device shown in FIG. 1 positioned in a second position with respect to an enclosure.

FIG. 5 is a block diagram of charging device 104 positioned in a first position 402 within an enclosure 404. FIG. 6 is a block diagram of charging device 104 positioned in a second position 406 with respect to enclosure 404.

In an exemplary embodiment, enclosure 404 is a cabinet or another housing that encloses charging device 104 while charging device 104 is in first position 402. Second position 406 is a position in which charging device 104 is at least partially outside enclosure 404 such that power conduit 112 is accessible and/or extendible for use in delivering current to power storage device 106 during a charging operation. Enclosure 404 may be manufactured from any suitable material, such as steel, that protects charging device 104 and/or hinders unauthorized access to charging device 104. Charging device 104 is moved from first position 402 to second position 406 to enable the charging operation to be initiated upon a determination that the predetermined actuation condition is met, as is described above with reference to FIGS. 3 and 4. Charging device 104 is moved back into enclosure 404 (i.e., from second position 406 to first position 402) when the charging operation has completed or when controller 200 otherwise controls actuator 226 to retract charging device 104 into enclosure 404. In other respects, charging device 104 operates in a similar manner as described above with reference to FIGS. 3 and 4.

Figure 7:
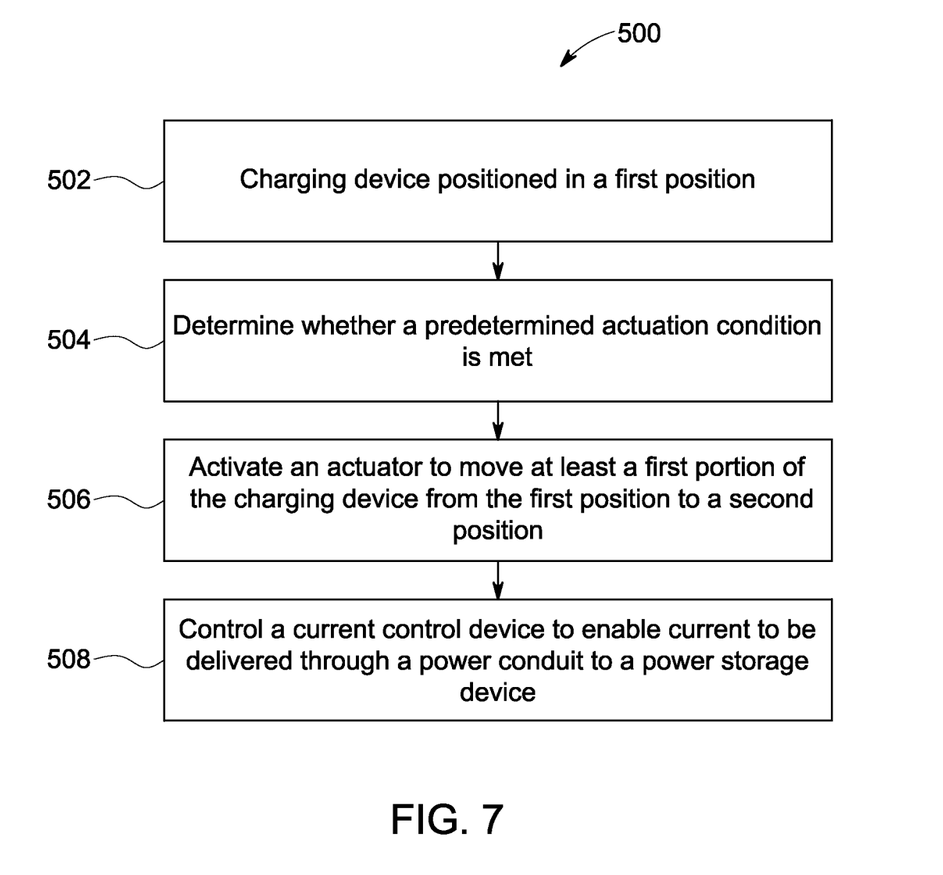
FIG. 7 is a flow diagram of an exemplary method of delivering current to a power storage device that may be used with the charging device shown in FIG. 1.

FIG. 7 is a flow diagram of an exemplary method 500 of delivering current to a power storage device, such as power storage device 106 (shown in FIG. 1). In an exemplary embodiment, method 500 is executed by controller 200 (shown in FIG. 2) of charging device 104 (shown in FIG. 1). More specifically, method 500 includes a plurality of instructions stored within memory device 204, and is at least partially executed by processor 202 (both shown in FIG. 2).

In an embodiment, charging device 104, or at least a portion thereof, is initially positioned 502 in a first position, such as first position 302 within chamber 306 (shown in FIG. 3) or first position 402 within enclosure 404 (shown in FIG. 5), when a charging operation is not in progress. Accordingly, in one embodiment, at least a portion of charging device 104 is positioned below ground 308 while in the first position. While charging device 104 is positioned 502 in the first position, power conduit 112 is prevented from being extended towards electric vehicle 102 from charging device 104 such that power conduit 112 is prevented from being plugged into, or otherwise coupled to, electric vehicle 102. In addition, controller 200 controls contactor 222 (e.g., opens contactor 222) to prevent current from flowing through power conduit 112 when charging device 104 is positioned in first position 302. Accordingly, current is prevented from being delivered through power conduit 112 to power storage device 106 when charging device 104 is in the first position.

Controller 200 determines 504 whether a predetermined actuation condition is met to enable charging device 104 to be moved into position for initiating a charging operation. The actuation condition includes, without limitation, determining or detecting that electric vehicle 102 is within predetermined distance 314 of charging device 104, determining that a payment has been received to initiate the charging operation of power storage device 106, receiving a signal from a user device, and/or receiving a signal from electric vehicle 102. The user device may include, for example, a cellular phone, a remote control key fob, a payment card, and/or any other device operated by the user to transmit a wireless signal to charging device 104. The signal received from electric vehicle 102 may include, for example, a signal transmitted through power conduit 112 or wirelessly upon turning off electric vehicle 102, unlocking or locking one or more doors of electric vehicle 102, shifting a drive train of electric vehicle 102 into a "park" or a similar position, and/or any other suitable signal that enables method 500 to function as described herein.

When the actuation condition is determined 504 to be met, controller 200 activates 506 actuator 226 to move charging device 104, or at least a portion thereof, from the first position to a second position, such as second position 304 (shown in FIG. 3) or second position 406 (shown in FIG. 4). In one embodiment, actuator 226 moves charging device 104 from within chamber 306 (in first position 302) to a position above ground 308 (in second position 304). In another embodiment, actuator 226 moves charging device 104 from within enclosure 404 (in first position 402) to a position outside of enclosure 404 (in second position 406). In the second position, charging device 104 is oriented and positioned to initiate the charging operation. More specifically, in the second position, power conduit 112 is extendable towards electric vehicle 102 and is enabled to be plugged into, or coupled to, a charging port of electric vehicle 102 and/or of power storage device 106.

When charging device 104 is in the second position and power conduit 112 is coupled to electric vehicle 102, controller 200 controls 508, or operates, current control device 222 to enable current to be delivered through power conduit 112 to power storage device 106. Accordingly, controller 200 initiates the charging operation and current is delivered to power storage device 106.

A technical effect of the device and method described herein includes at least one of (a) determining, by a controller, whether a predetermined actuation condition is met; (b) activating an actuator to move at least a first portion of a charging device from a first position to a second position upon the determination that a predetermined actuation condition is met; and (c) controlling a current control device to enable current to be delivered to a power storage device when at least a first portion of a charging device is in a second position.

Exemplary embodiments of a charging device and method of delivering current to a power storage device are described above in detail. The charging device and method are not limited to the specific embodiments described herein, but rather, components of the charging device and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device for use with a power storage device, said charging device comprising:
    a current control device configured to selectively enable and disable current from being delivered to the power storage device;
    a communication device configured to receive signals from an electric vehicle;
    an actuator configured to move at least a first portion of said charging device from an inaccessible position to an accessible position, wherein the first portion is inaccessible in the inaccessible position and accessible in the accessible position;
    a payment interface that is accessible to a user when said charging device is in the inaccessible position; and
    a controller coupled to said actuator, to said communication device, and to said current control device, said controller configured to:
        determine that the electric vehicle is transitioning between an on state and an off state based on the signals received at said communication device;
        activate said actuator to move said at least a first portion of said charging device to the accessible position based upon the determination; and
        control said current control device to enable current to be delivered to the power storage device when said at least a first portion of said charging device is in the accessible position.

2. A charging device in accordance with claim 1, wherein said at least a first portion of said charging device is below ground when in the inaccessible position.

3. A charging device in accordance with claim 2, wherein said at least a first portion of said charging device is above ground when in the accessible position.

4. A charging device in accordance with claim 1, wherein said at least a first portion of said charging device is positioned within an enclosure when in the inaccessible position.

5. A charging device in accordance with claim 1, wherein said controller is further configured to control said current control device to prevent current from being delivered to the power storage device when said at least a first portion of said charging device is in the inaccessible position.

6. A charging device in accordance with claim 1, further comprising a power conduit coupled to said current control device, said at least a first portion of said charging device comprises at least a portion of said power conduit.

7. A charging device in accordance with claim 1, wherein the power storage device is a power storage device of the electric vehicle, and wherein said controller determines that the electric vehicle is within the predetermined distance of said charging device based on one of a wireless signal, a radio frequency identification (RFID) signal, and a near field communication signal transmitted from the electric vehicle.

8. A method of delivering current to a power storage device, said method comprising:
receiving, by a controller, a signal from an electric vehicle indicating that the electric vehicle is transitioning between an on state and an off state;
determining, by the controller, whether payment has been received at a payment interface that is accessible to a user when said charging device is in an inaccessible position to initiate a charging operation of the power storage device;
activating an actuator to move at least a first portion of a charging device from the inaccessible position to an accessible position based upon the determination that payment has been received and based upon the received signal, wherein the first portion is inaccessible in the inaccessible position and accessible in the accessible position; and
controlling a current control device to enable current to be delivered to the power storage device when the at least a first portion of the charging device is in the accessible position.

9. A method in accordance with claim 8, further comprising positioning the at least a first portion of the charging device below ground in the inaccessible position.

10. A method in accordance with claim 9, further comprising positioning the at least a first portion of the charging device above ground in the accessible position.

11. A method in accordance with claim 8, further comprising positioning the at least a first portion of the charging device within an enclosure in the inaccessible position.

12. A method in accordance with claim 8, further comprising preventing current from being delivered to the power storage device when the at least a first portion of the charging device is in the inaccessible position.

13. A method in accordance with claim 8, wherein a power conduit is coupled to the charging device, said method further comprising preventing the power conduit from being extended from the charging device when the at least a first portion of the charging device is in the inaccessible position.

14. A method in accordance with claim 8, wherein the predetermined actuation condition is determined to be met when the controller determines that an electric vehicle is within a predetermined distance of the charging device.

15. A method in accordance with claim 8, wherein the predetermined actuation condition is determined to be met when the controller determines that payment has been received to initiate a charging operation of the power storage device.

16. A method in accordance with claim 8, wherein the predetermined actuation condition is determined to be met when the controller receives a signal from a user device controlled by the user.

17. A method in accordance with claim 8, wherein determination that payment has been received is a first actuation condition, said method further comprising:
determining that a second actuation condition is met; and
activating the actuator to move the at least a first portion of the charging device from the accessible position to the inaccessible position upon the determination that the second actuation condition is met.

18. A method in accordance with claim 17, wherein a power conduit is coupled to the charging device, the second actuation condition is determined to be met when the controller determines that the power conduit is disconnected from one of the power storage device and the charging device.

19. A charging device for use with a power storage device, said charging device comprising:
a current control device configured to selectively enable and disable current from being delivered to the power storage device;
a communication device configured to receive signals from an electric vehicle, wherein the signals indicate that the electric vehicle is transitioning between an on state and an off state;
an actuator configured to move at least a first portion of said charging device from an inaccessible position to an accessible position, wherein the first portion is inaccessible in the inaccessible position and accessible in the accessible position; and
a payment interface that is accessible to a user when said charging device is in the inaccessible position;
a controller coupled to said actuator, said communication device, and to said current control device, said controller configured to:
activate said actuator to move said at least a first portion of said charging device to the accessible position based on the signals received at said communication device; and
control said current control device to enable current to be delivered to the power storage device when said at least a first portion of said charging device is in the accessible position.

* * * * *